Figure 15:
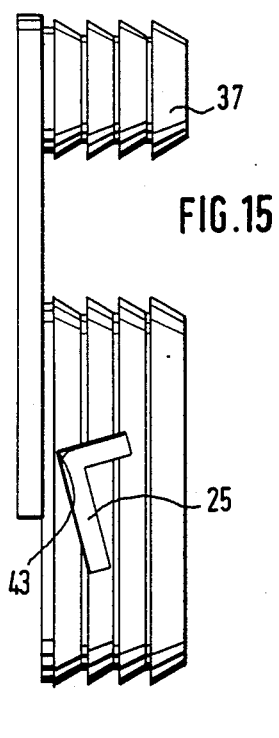

United States Patent [19]

Salice

[11] Patent Number: 4,752,150
[45] Date of Patent: Jun. 21, 1988

[54] CONNECTING FITTING

[75] Inventor: Luciano Salice, Carimate, Italy

[73] Assignee: Arturo Salice S.p.A., Novedrate, Italy

[21] Appl. No.: 329,872

[22] Filed: Dec. 11, 1981

[30] Foreign Application Priority Data

Dec. 17, 1980 [DE] Fed. Rep. of Germany ....... 3047642
May 18, 1981 [EP] European Pat. Off. ....... 81 103813.2

[51] Int. Cl.$^4$ .......................... B25G 3/18; F16B 21/00
[52] U.S. Cl. .................................. 403/330; 403/231; 403/407.1
[58] Field of Search ................. 403/13, 14, 9, 7, 231, 403/245, 407, 405, 322, 330, 20, 372, 325

[56] References Cited

U.S. PATENT DOCUMENTS

| | | | |
|---|---|---|---|
| 358,883 | 10/1931 | Horobin et al. | 403/322 |
| 2,739,361 | 3/1956 | Elsner | 403/322 X |
| 2,805,866 | 9/1957 | Amend | 403/330 X |
| 2,840,405 | 6/1958 | Feltz et al. | 292/122 |
| 3,008,741 | 11/1961 | MacCormack | 403/7 |
| 3,365,223 | 1/1968 | Bisbing | 403/20 |
| 3,456,969 | 7/1969 | Wittenmayer | 403/406 |
| 3,526,040 | 9/1970 | Young | 403/330 X |
| 3,574,367 | 4/1971 | Jankowski | 403/322 X |
| 3,608,935 | 9/1971 | Hodapp, Jr. | 403/321 X |
| 3,944,153 | 3/1976 | Linker | 403/330 |
| 3,999,878 | 12/1976 | Robinson | 403/407 |
| 4,091,500 | 5/1978 | Lautenschlager | 16/145 |
| 4,099,293 | 7/1978 | Pittasch | 403/322 X |
| 4,160,610 | 7/1979 | Austen-Brown et al. | 403/231 X |
| 4,186,976 | 2/1980 | Okada | 403/321 X |
| 4,272,207 | 6/1981 | Lautenschlager | 403/407 |
| 4,286,891 | 9/1981 | Gerner et al. | 403/7 |
| 4,300,455 | 11/1981 | Ornati | 403/231 X |
| 4,325,649 | 4/1982 | Rock | 403/231 |
| 4,355,917 | 10/1982 | Bonger | 403/322 X |
| 4,360,282 | 11/1982 | Koch | 403/322 X |
| 4,361,931 | 12/1982 | Schnelle et al. | 403/231 X |
| 4,416,040 | 11/1983 | Towsley | 403/361 X |

FOREIGN PATENT DOCUMENTS

| | | |
|---|---|---|
| 1300357 | 6/1969 | Fed. Rep. of Germany . |
| 2541554 | 3/1977 | Fed. Rep. of Germany . |
| 2546526 | 4/1977 | Fed. Rep. of Germany . |
| 2748272 | 5/1979 | Fed. Rep. of Germany . |
| 2836678 | 3/1980 | Fed. Rep. of Germany . |
| 3006728 | 9/1980 | Fed. Rep. of Germany . |
| 2909656 | 9/1980 | Fed. Rep. of Germany . |
| 2908475 | 9/1980 | Fed. Rep. of Germany . |

Primary Examiner—Andrew V. Kundrat
Attorney, Agent, or Firm—Fleit, Jacobson, Cohn & Price

[57] ABSTRACT

A connecting fitting for detachably connecting two platelike furniture parts, which adjoin and extend preferably at right angles to each other consists of two fitting elements, which are adapted to be secured to respective furniture parts to be connected and one of which has at least one bar-shaped portion which is adapted to be inserted into an opening of the other fitting element until the housings of the fitting elements and/or the furniture parts engage each other, and said one fitting element is adapted to be connected to the other by locking means, which force the fitting elements against each other. In order to facilitate the mounting of such fitting the locking device comprises a detent lever, which is mounted in one fitting element and pivotally movable against the force of a spring and at its forward end carries a detent hook, the other fitting element comprises a step or rib, which has an abutment edge or another detent abutment, and when the detent lever has been inserted into an opening of said other fitting element the detent hook snaps behind said step or rib so that said rear face is urged by said spring against said detent abutment and exerts a wedge action thereon.

54 Claims, 14 Drawing Sheets

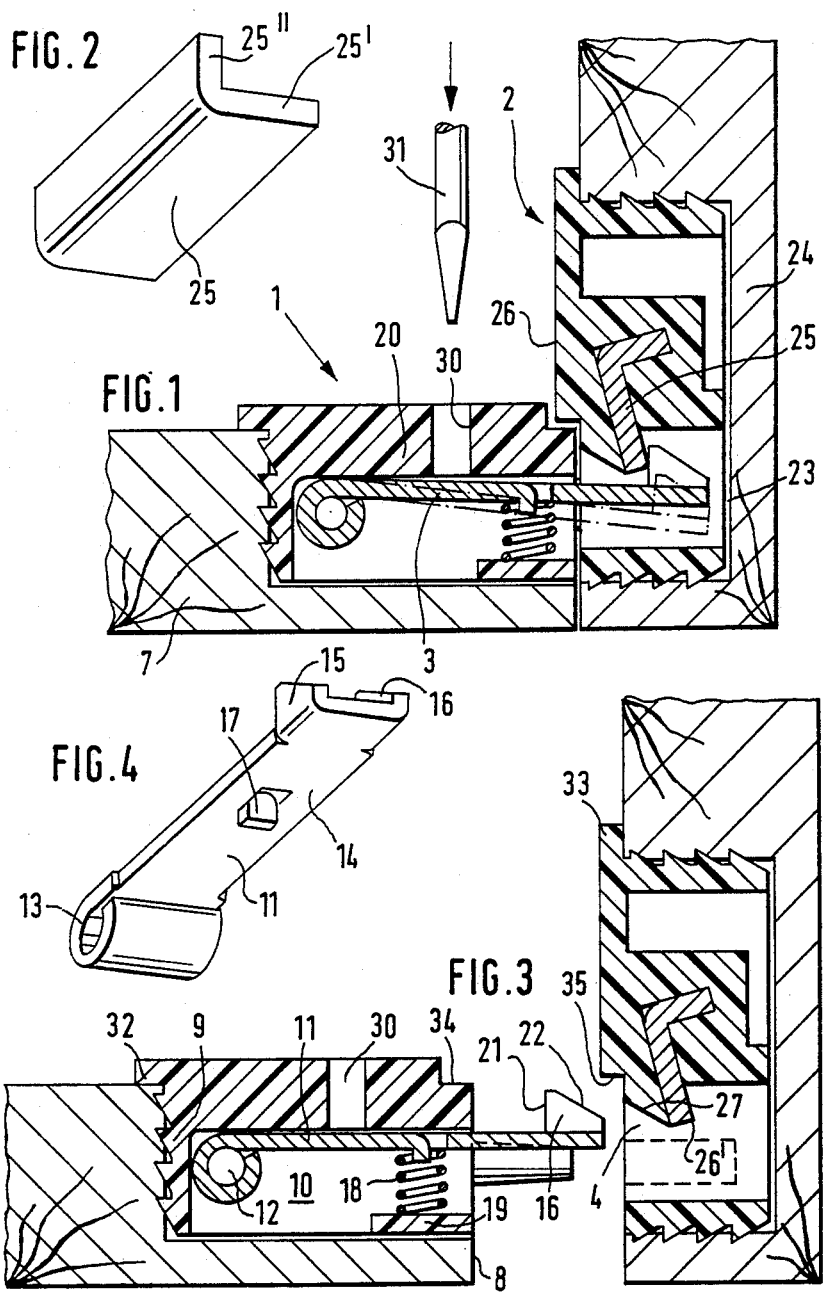

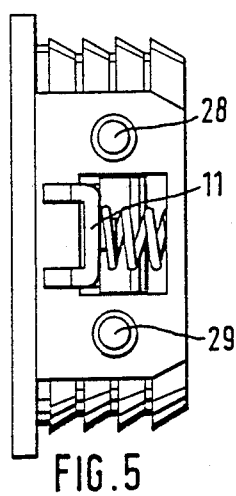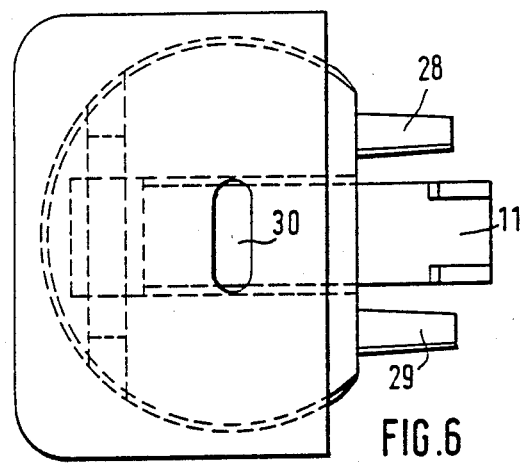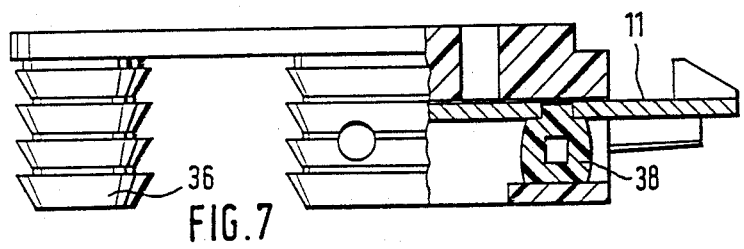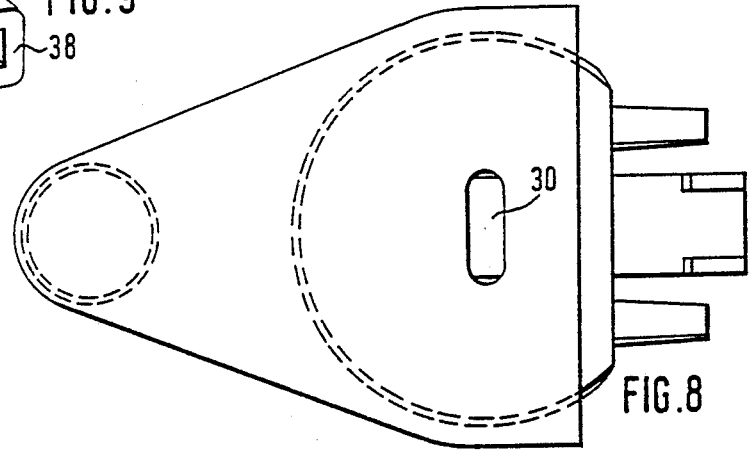

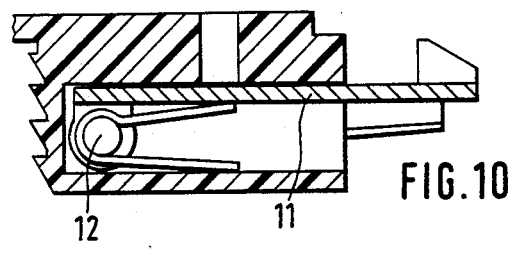
FIG.10
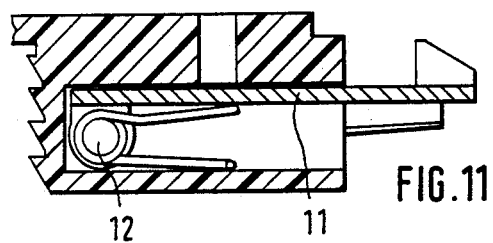
FIG.11
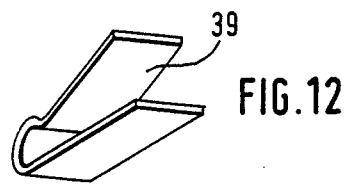
FIG.12
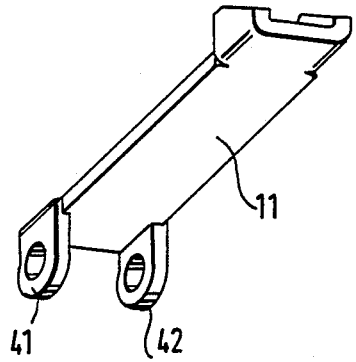
FIG.14
FIG.13

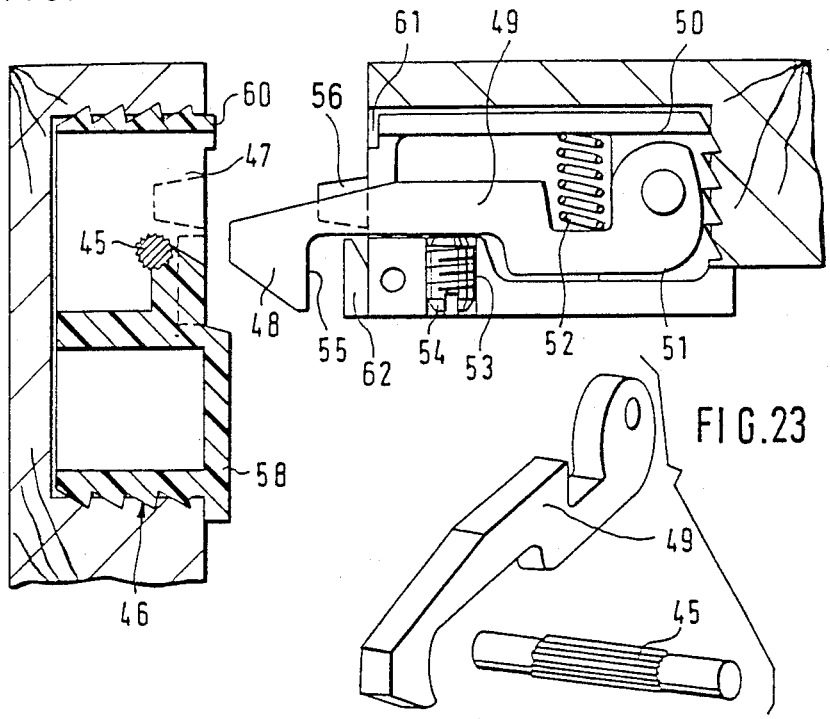
FIG. 22
FIG. 23
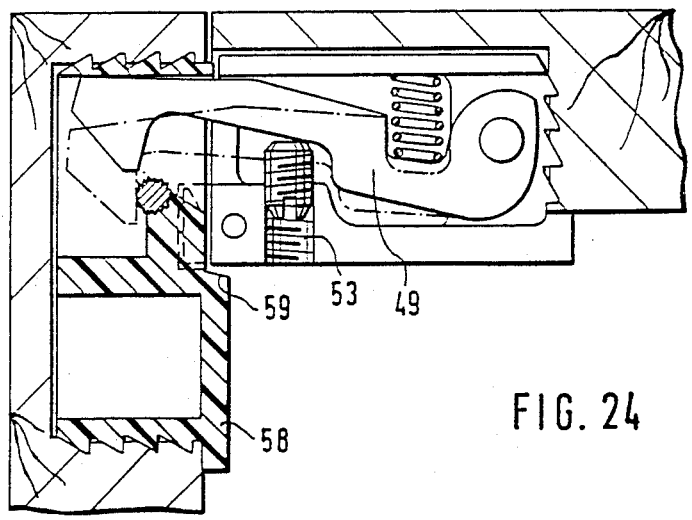
FIG. 24

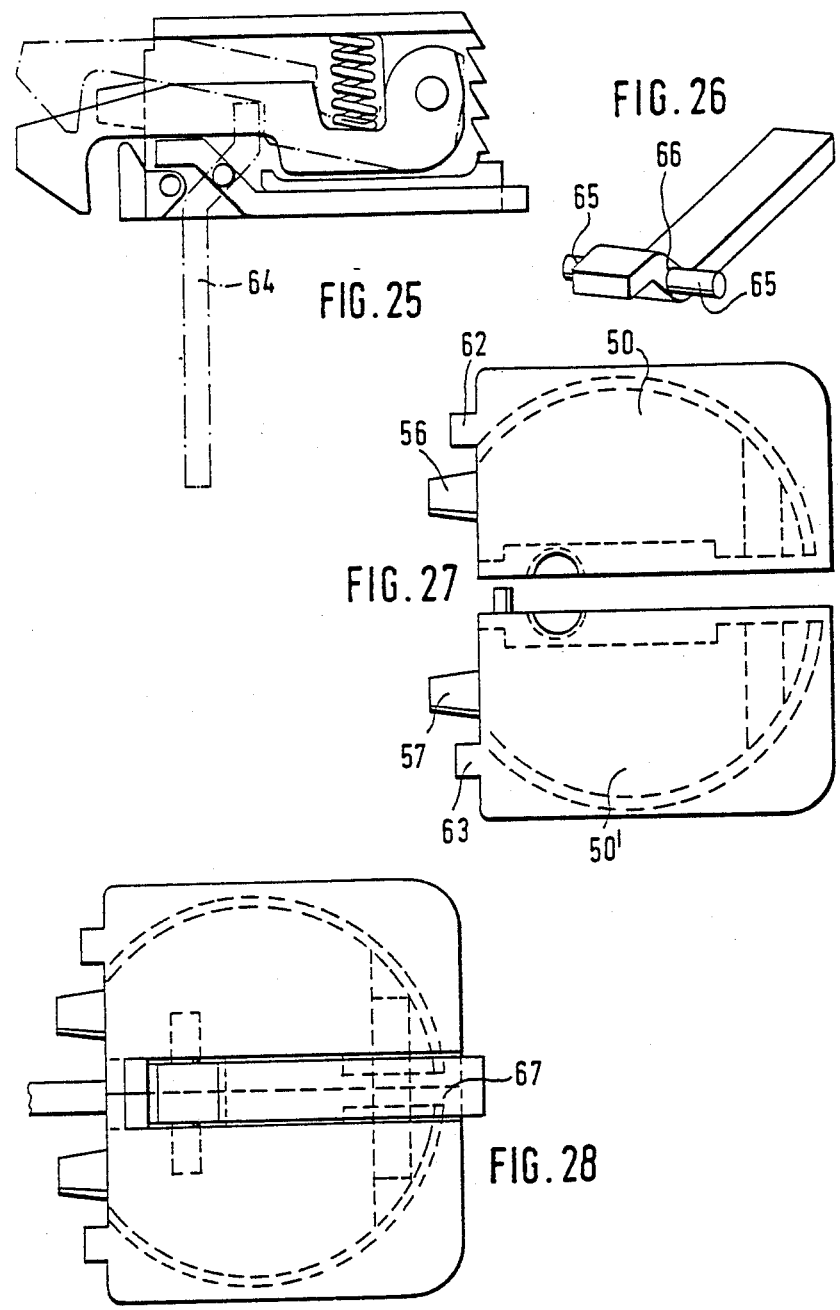

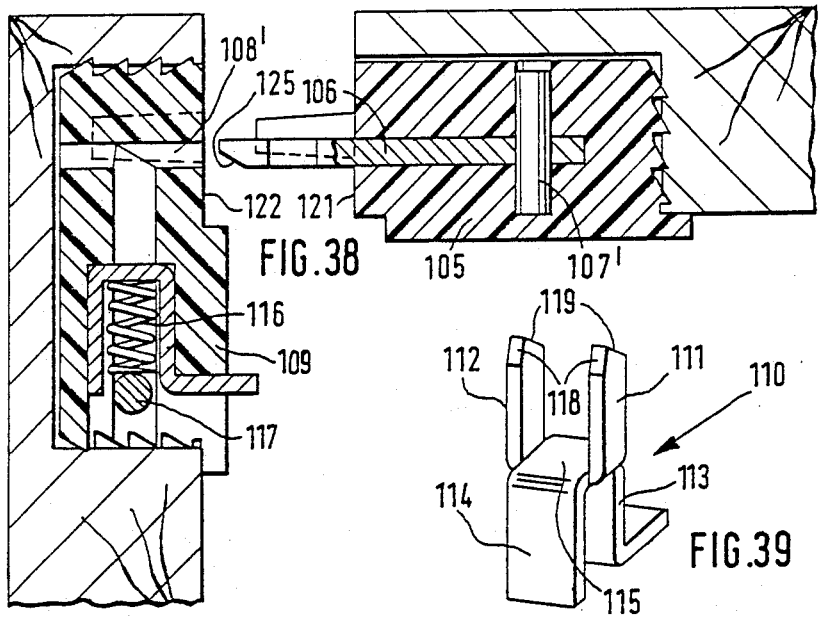
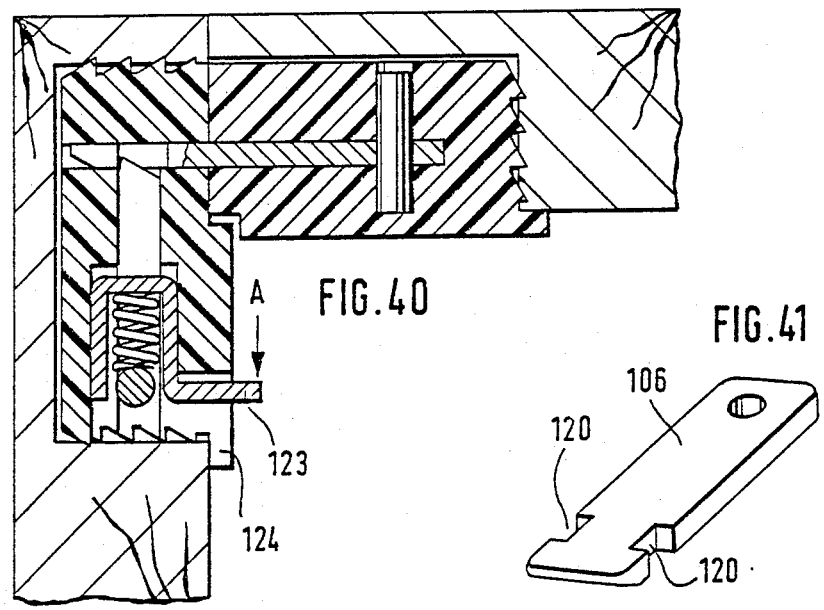

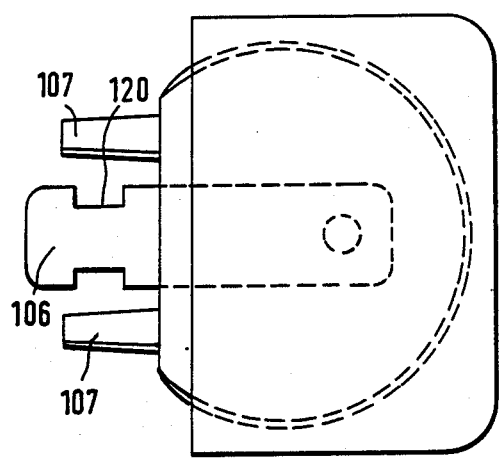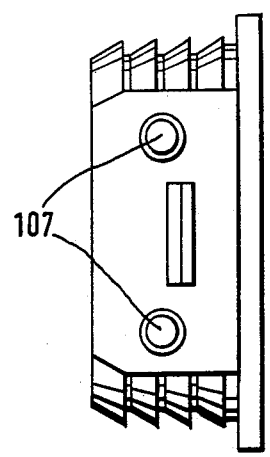
FIG.42  FIG.43
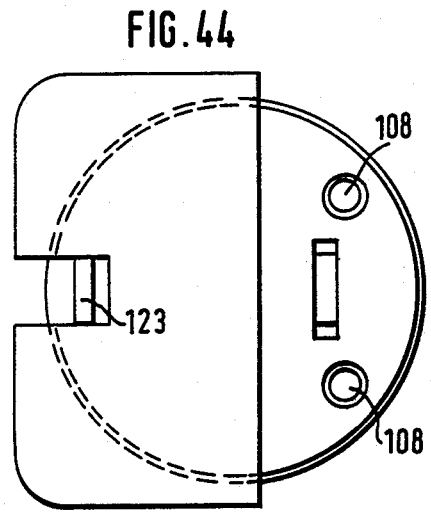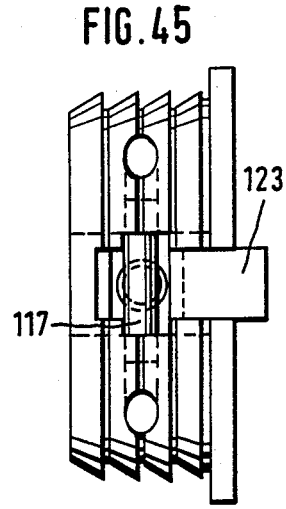
FIG.44  FIG.45

CONNECTING FITTING

This invention relates to a connecting fitting for detachably connecting two platelike furniture parts, which preferably extend at right angles to each other, comprising two fitting elements, which are adapted to be secured to respective furniture parts to be connected and one of which has at least one bar-shaped portion which is adapted to be inserted into an opening of the other fitting element until the housings of the fitting elements and/or the furniture parts engage each other, and said one fitting element is adapted to be connected to the other by locking means, which force the fitting elements against each other.

Connecting fittings for detachably connecting platelike furniture parts, e.g., the bottoms and side walls of cupboards, wardrobes, lockers or the like, are known in various forms.

For instance, German Patent Specification No. 13 00 357, German Early Disclosure No. 30 06 728 and German Utility Model Specification No. 79 27 805 disclose connecting fittings having one fitting element which comprises a housing that is secured to one furniture part, a connecting screw, which is rotatably mounted in said housing and adapted to be screwed into a preferably expansible plug fixed in the other furniture part, and an actuating screw, which is operatively connected by bevel gearing to the connecting screw.

German Patent Publication No. 25 46 526 discloses a connecting fitting comprising an expansible pin, which is slidably mounted on an expanding element of a pot-shaped retaining member, which is secured in one furniture part. To connect the furniture parts the expansible pin is inserted into a bore of the other furniture part and is subsequently expanded in that the expansible pin is displaced relative to the edge-shaped expanding element by an actuating screw.

German Early Disclosures Nos. 29 09 656, 29 08 475, 25 41 554, 28 36 678 and 27 48 272 disclose connecting fittings which are of the kind described first hereinbefore and in which the locking means which force the fitting elements against each other consist of rotatably mounted wedges, which can be rotated by screwdrivers or the like to a position in which the furniture parts are connected to each other.

Many of the known connecting fittings are complicated and expensive structures and for this reason cannot be made as economically as is required for mass production, Besides, all known connecting fittings of the kind discussed hereinbefore have the disadvantage that they can be mounted only with difficulty and a screwdriver or another tool is required to connect the fitting elements and to force them against each other, if this is necessary.

For this reason it is an object of the present invention to provide a connecting fitting which is of the kind described first hereinbefore and which can be manufactured economically and comprises fitting elements which can be connected in a particularly simple manner and without using a tool when it is desired to connect the furniture parts.

This object if accomplished in accordance with the invention in that the locking device comprises a detent lever, which is mounted in one fitting element and pivotally movable against the force of a spring and at its forward end carries a detent hook, the other fitting element comprises a step or rib, which has an abutment edge or another detent abutment, and when the detent lever has been inserted into an opening of said other fitting element the detent hook snaps behind said step or rib so that said rear face is urged by said spring against said detent abutment and exerts a wedge action thereon. That wedge action is due to the fact that the spring tends to move the rear face of the hook across the detent abutment. As a result of that wedge action, the detent lever is subjected to a substantial tensile force, by which the fitting elements are forced against each other. It will be understood that the rear face of the detent hook must be associated with the detent abutment in such a manner that the abutment will not engage the body of the detent lever because in that case the wedge action forcing the fitting elements against each other would be eliminated.

To facilitate the insertion of the detent lever into the opening of the other fitting element, the edge of the opening or the forward face of the detent lever is preferably beveled. In that case the engagement of the detent lever with the edge of the opening at said beveled surface will cause the detent lever to be depressed until it has been moved behind the detent abutment and is then urged to its locked position.

The self-locking interengagement of the two fitting elements can be eliminated in a simple manner if the housing of the fitting element provided with the detent lever has an opening through which a tool, for instance, a screwdriver, can be inserted in order to depress the detent lever so as to release the locking means.

The detent abutment for engaging the hook of the detent lever may be constituted by a pin, which is circular in cross-section and suitably forms an upper edge of a suitable step of the housing. In that case the rear face of the detent hook of the detent lever must be so arranged that when the fitting elements interengage said rear face bears on the pin and there is a clearance between the pin and the free end of the rear face of the hook. In such an arrangement the rear face of the hook will be slightly inclined and engage the pin at a small wedge angle so that the spring which biases the detent lever will force the fitting elements against each other. A slight inclination of the rear face of the detent hook can also be ensured in that the pivot pin for the detent lever is properly positioned in such a manner that the radial distance from the rear face of the hook to the pivotal axis of the detent lever decreases gradually from the point where the rear face of the hook engages the pin toward the root of the hook. The frictional forces acting between the pin and the rear face of the detent hook can be increased in that the pin is knurled or provided with axial grooves.

Adjacent to the detent level, the top wall of the housing may be formed with a tapped bore and a screw for depressing the detent lever against the force of the spring may be adapted to be screwed into said tapped opening. In that case the fitting elements can be unlocked and the detent lever can be held in the unlocked position in that the screw is screwed into the opening.

The housinglike fitting element provided with the detent abutment may be provided with a projection on that side which is opposite to its mounting flange and said projection may enter a corresponding recess on the end face of the other fitting element.

According to an optional feature the invention, a two-armed lever is pivoted to the top wall of the fitting element that is provided with the detent lever and the longer arm of said two-armed lever engages the outside surface of said top wall and its shorter arm engages the detent lever in such a manner that when the longer lever arm is approximately parallel to said top wall the detent lever is pivotally movable to its locking position and that the longer lever arm can be raised to disengage the detent lever from the abutment edge or other detent abutment. In that case the fitting elements can be unlocked simply in that the longer arm of the two-armed lever is raised. The two-armed lever is suitably offset in such a manner that it is held in its raised position by the swung-out detent lever.

In a simple design the spring which biases the detent lever may consist of a tongue which has been struck out from the housing of the fitting element. That design will be particularly suitable if the housing consists of a plastic material which has a suitable elasticity.

For a connection of two bottoms or the like to partition, e.g., an embodiment of the invention comprises two fitting elements, which are provided with abutment edges or other detent abutments and can be inserted from opposite sides into a through bore of the partition, and the two associated fitting elements of said fittings are provided with mutually offset detent levers. Because the detent levers are offset from each other, they can overlap each other in the locking position without interfering with each other. Alternatively, a fitting element having only one abutment edge or other detent abutment may be inserted into the through bore and the detent levers inserted from opposite sides may snap behind said detent abutment.

In another embodiment of the invention, two detent levers, which are spring-biased toward their expanded position, are pivoted in a fitting element on a pivot pin which extends at right angles to the longitudinal direction of the fitting element, and the other fitting element has an intermediate opening for receiving the detent levers and on both sides of said opening is provided with abutment edges or other detent abutments which are parallel to the pivot pin. In such an arrangement the fitting elements can be unlocked in a simple manner if those lever arms which are opposite to the lever arms provided with the hooks are provided with angled actuating elements, which extend through an arcuate slot formed in the top wall of the fitting element and can be urged toward each other so that the lever arms which carry the hooks move like pincers so as to unlock the fitting elements. The expanding spring may consist of a helical torsion spring which has extended legs arranged in a V configuration and the convolution of such spring may surround the pivot pin whereas its legs bear on those lever arms which carry the actuating elements.

In accordance with another proposal according to the invention the object set forth in accomplished in that one fitting element comprises a tongue, which has a recess or hole and is adapted to be inserted into a guide hole of the other fitting element, which has a bore or a recess that is provided with guides, said bore or recess extends approximately at right angles to the guide hole, a spring-loaded slider is longitudinally slidably mounted in said bore or recess and has a curved or wedge-shaped portion that extends through the guide hole for the tongue, and when the tongue has been inserted said curved or wedge-shaped portion bears on the forward edge of said bore or recess in such a manner that the tongue is locked and stressed in tension. The fitting elements can then be unlocked by the actuation of an angled actuating element, which is carried by the slider and extends through a slot beyond the forward end of the fitting element.

Further embodiments of the invention will be described more fully in the dependent claims.

Figure 16:
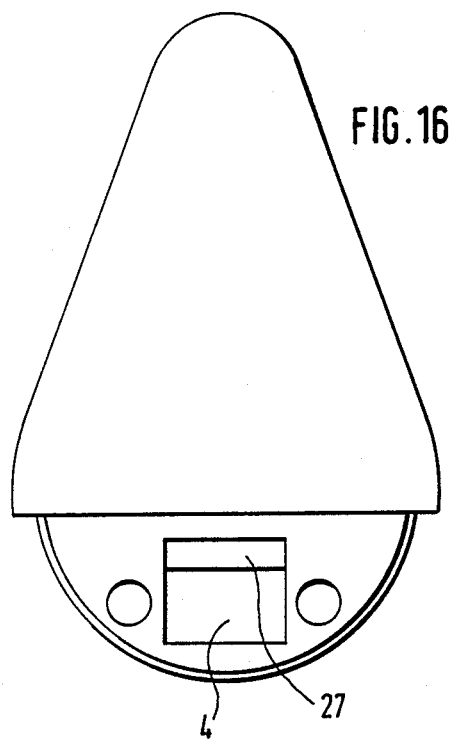
Figure 17:
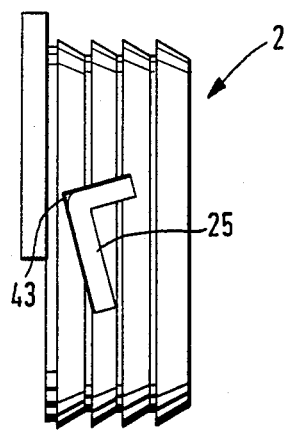
Figure 18:
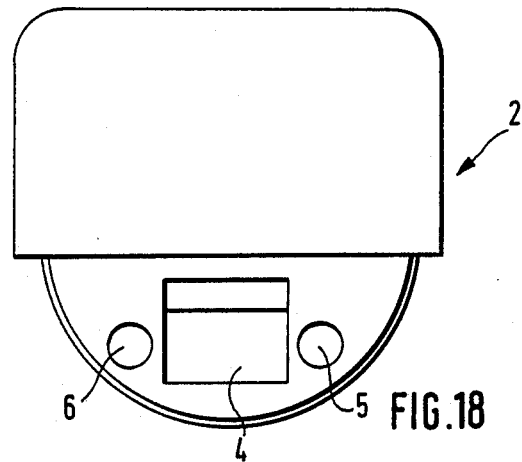
Figure 19:
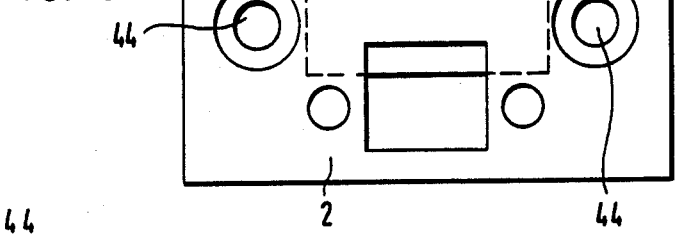
Figure 20:
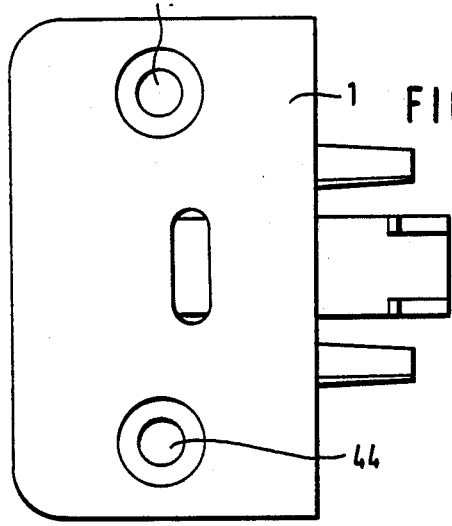
Figure 21:
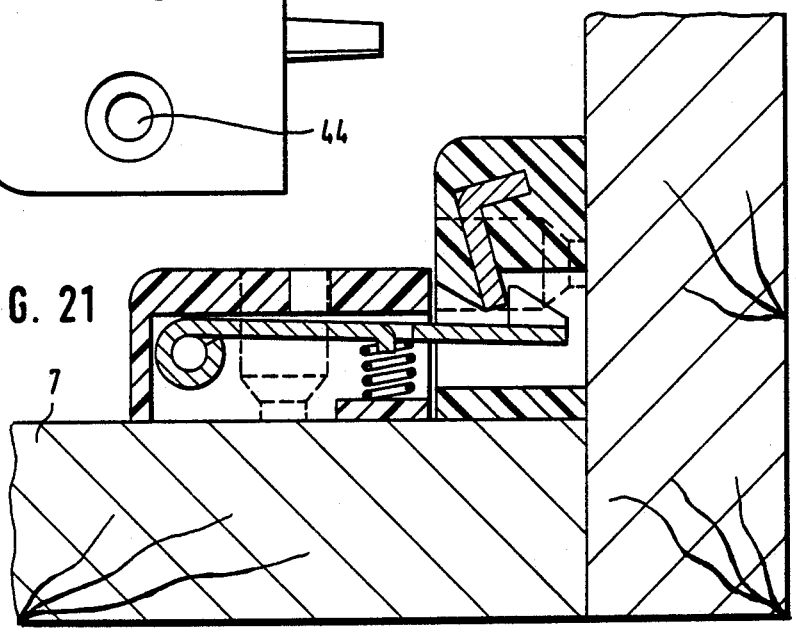
Figure 29:
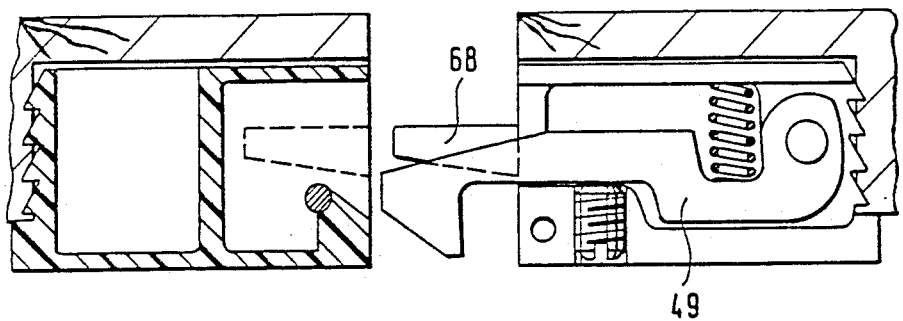
Figure 30:
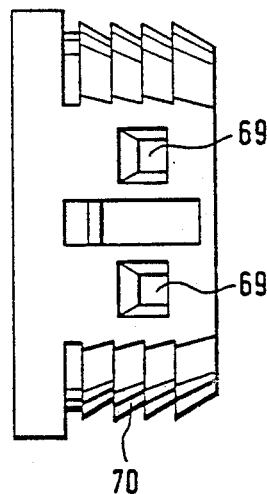
Figure 31:
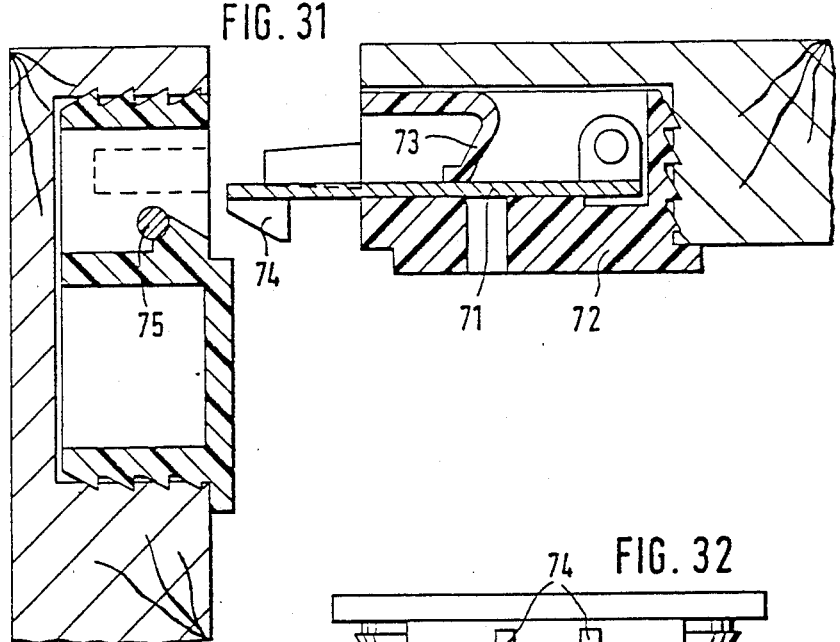
Figure 32:
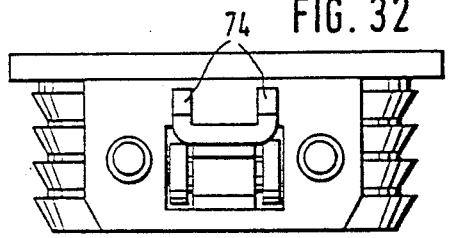
Figure 32A:
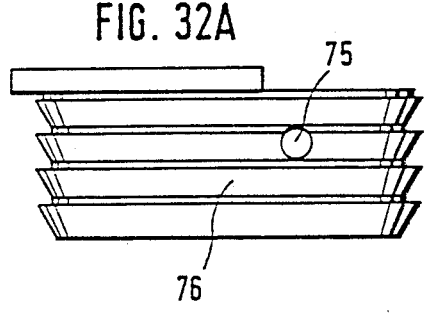
Figure 33:
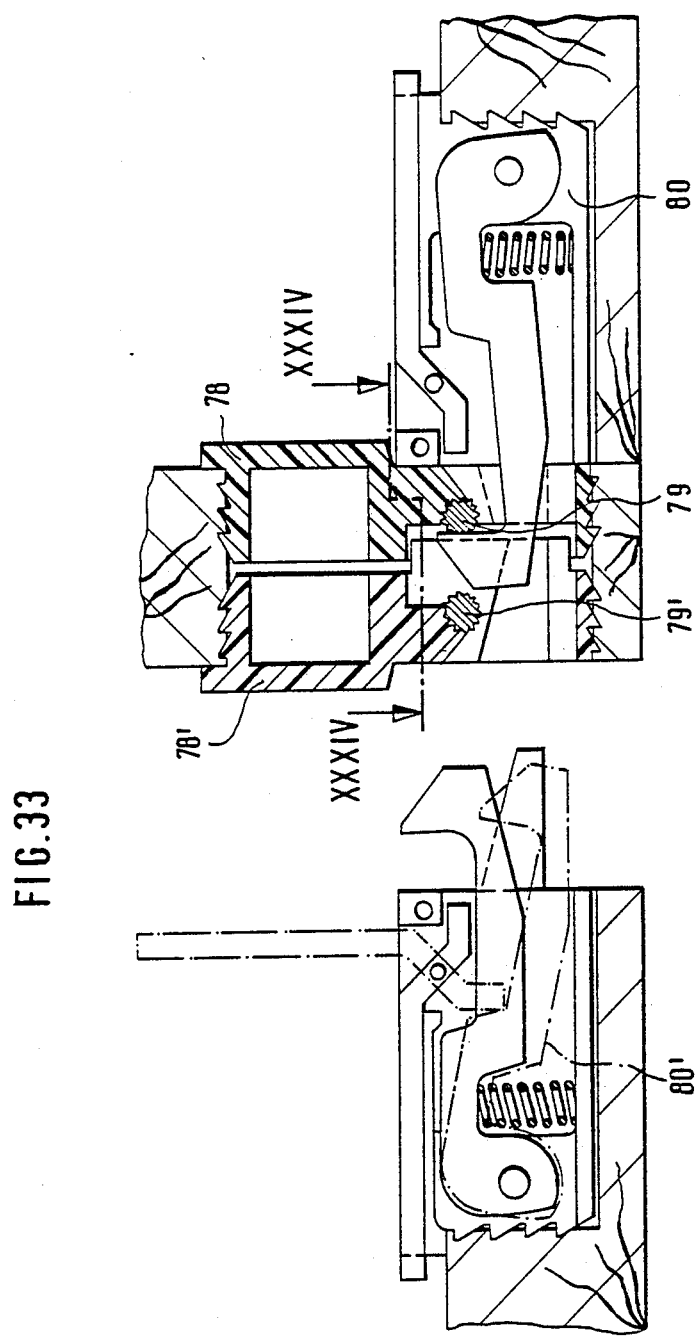
Figure 34:
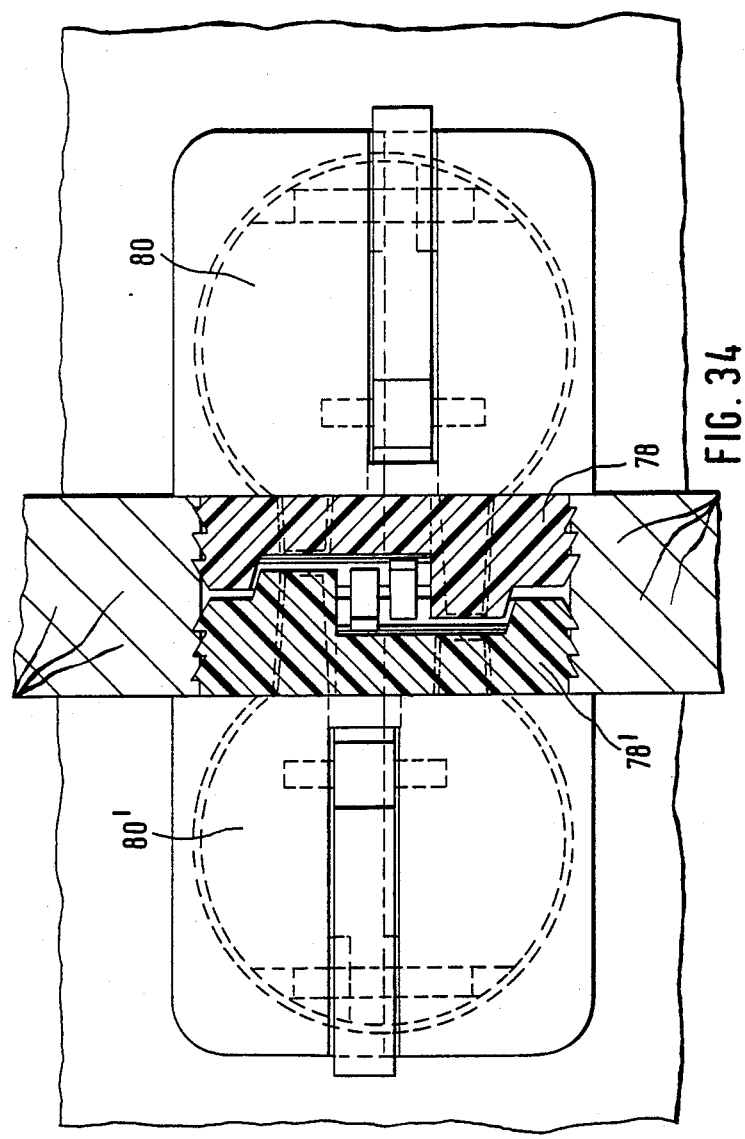
Figure 35:
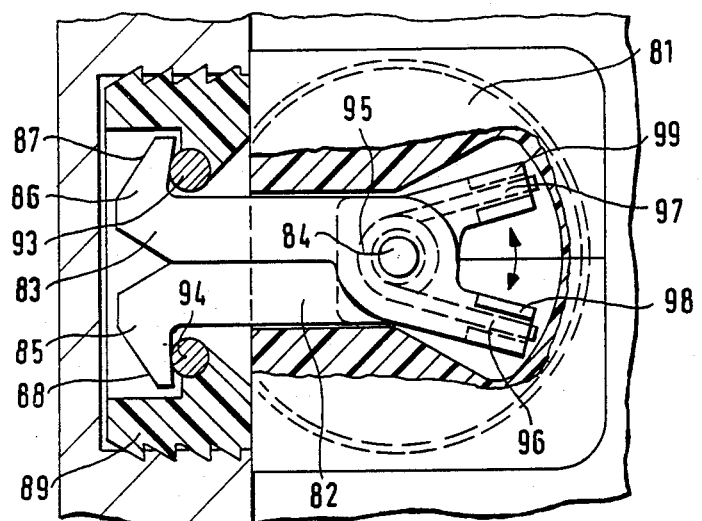
Figure 36:
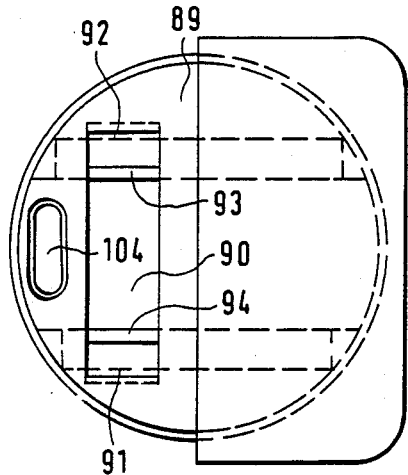
Figure 37:
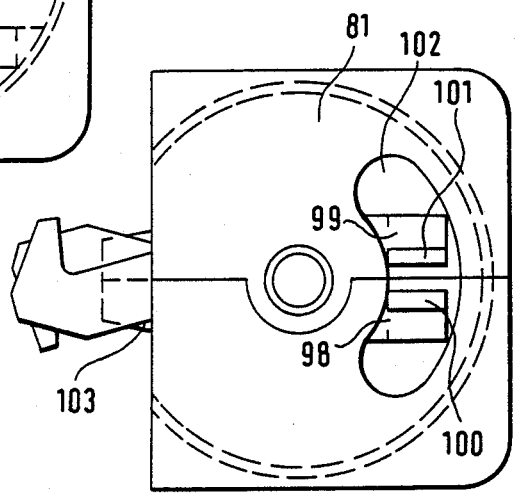

Embodiments of the invention will now be explained more fully with reference to the drawings, in which FIG. 1 is a sectional view showing a connecting fitting for connecting two platelike furniture parts which extend at right angles to each other, FIG. 2 is a perspective view showing the angled sheet metal element which forms an abutment edge of one fitting element of FIG. 1, FIG. 3 is a view that is similar to FIG. 1 and shows the connecting fitting of FIG. 1 before the fitting elements have been pushed together so as to be locked, FIG. 4 is a perspective view showing a detent lever that is pivoted to one fitting element of FIG. 1, FIG. 5 is a front elevation showing that fitting element of FIGS. 1 and 3 which is provided with the detent lever, FIG. 6 is a top plan view showing the fitting element of FIG. 5, FIG. 7 is a side elevation showing another embodiment of the fitting element provided with the detent lever, partly in section, FIG. 8 is a top plan view showing the fitting element of FIG. 7, FIG. 9 is a perspective view showing the rubber block which resiliently biases the detent lever of FIG. 7, FIG. 10 is a sectional view showing a fitting element having a detent lever which is biased by a V-shaped leaf spring, FIG. 11 is a view that is similar to FIG. 10 and shows a helical spring which has end legs and is used to bias the detent lever, FIG. 12 is a perspective view showing the V-shaped leaf spring of FIG. 10, FIG. 13 is a perspective view showing the helical spring having end legs of FIG. 11, FIG. 14 is a perspective view showing the detent levers of the embodiments shown in FIGS. 11 and 12, FIG. 15 is a side elevation showing a fitting element which has receiving openings, FIG. 16 is a top plan view showing the fitting element of FIG. 15, FIG. 17 is a side elevation showing the fitting element of FIGS. 1 and 3, which is provided with receiving openings, FIG. 18 is a top plan view showing the fitting element of FIG. 17, FIG. 19 is a front elevation showing another embodiment of a fitting element formed with receiving openings, FIG. 20 is a top plan view showing a fitting element which is provided with a detent lever and adapted to be interlocked with the fitting element of FIG. 19, FIG. 21 is a sectional view showing the fitting elements of FIGS. 19 and 20, which are interlocked and fixed by screws to furniture parts which extend at right angles to each other, FIG. 22 is a sectional view showing another embodiment of a connecting fitting, which connects two platelike furniture parts which extend at right angles to each other, FIG. 23 is a perspective view showing one fitting element of FIG. 22 and a detent abutment, which consists of a pin of the other fitting element, FIG. 24 shows the connecting fitting of FIG. 22 in an assembled condition, FIG. 25 is a side elevation showing one housing half of the fitting element of FIG. 22 provided with the detent lever, which housing half is provided with an opening lever, FIG. 16 is a perspective view showing the opening lever of FIG. 25, FIG. 27 is a top plan view showing the split housing of the fitting element of FIG. 22, which is provided with the detent lever, FIG. 28 is a top plan view showing the housing of FIG. 25 in a closed state, FIG. 29 is a sectional view showing a connecting fitting which connects two abutting platelike furniture parts, FIG. 30 is a front elevation showing that fitting element of FIG. 29 which is provided with the detent abutment, FIG. 31 is a sectional view showing another embodiment of a connecting fitting which connects two platelike furniture parts extending at an angle to each other, FIG. 32 is a front elevation showing that fitting element of FIG. 31 which is provided with the detent lever, FIG. 32A is a side elevation showing that fitting element of FIG. 31 which is provided with the detent abutment, FIG. 33 is a sectional view showing two connecting fittings, which connect two platelike furniture parts extending in the same plane to a partition on opposite sides thereof, FIG. 34 is a sectional view showing a connecting fitting and taken on line 34—34 in FIG. 33, FIG. 35 is a horizontal sectional view showing another embodiment of a connecting fitting which connects two platelike furniture parts which extend at right angles to each other, FIG. 36 is a front elevation showing that fitting element of FIG. 35 which is provided with the detent abutments, FIG. 37 is a top plan view showing that fitting element of FIG. 35 which is provided with pincerlike detent levers, FIG. 38 is a sectional view showing a last embodiment of a connecting fitting which connects two furniture parts extending at an angle to each other, FIG. 39 is a perspective view showing the locking slider of FIG. 38, FIG. 40 shows the connecting fitting of FIG. 38 in its locked state, FIG. 41 is a perspective view showing the detent tongue of FIG. 38, FIG. 42 is a top plan view showing that fitting element of FIG. 38 which is provided with the detent tongue, FIG. 43 is a top plan view showing the fitting element of FIG. 42, FIG. 44 is a front elevation showing that fitting element of FIG. 38 which is provided with the locking slider, and FIG. 45 is a top plan view showing the fitting element of FIG. 44.

The connecting fitting shown in FIGS. 1 to 6 and 17 and 18 consists of the fitting element 1, which is provided with a bar-shaped portion in the form of the detent lever 11, and of the fitting element 2, which is provided with the receiving openings 4, 5 and 6. The fitting element 1 is inserted into and secured in a recess which is formed in the bottom wall 7 of a cupboard and circular in cross-section. The recess is intersected by the plane of the end edge 8 of the bottom 7 so that the recess is open at the end edge 8. The housing 9 of the fitting element 1 is cylindrical, except for its front face, which is planar and when the housing 9 is secured in the recess is flush with the end face 8 of the bottom wall 7. The cylindrical peripheral surface of the housing 9 has a sawtooth-shaped profile in cross-section.

The fitting element 1 has a downwardly open recess 10, which is approximately rectangular in cross-section and in which the detent lever 11 is pivoted on the pivot pin 12, which is secured in the side walls of the fitting element 1. The detent lever 11 is a sheet metal stamping, the rear end portion of which has been curled to form a bearing eye 13. In the forward end portion of the detent lever 11, legs are angled from the web 14 of said lever. These legs constitute toothshaped detent noses 15, 16. A lug 17 is struck out from the intermediate length portion of the web 14 and serves to hold a compression spring 18 as shown in FIGS. 1 and 3. The compression spring 18 bears at its top end on the web 14 and at its other end on a crosspiece 19, which bridges the recess 10. When the fitting elements are unlocked, as in shown in FIG. 3, the compression spring 18 is held between the crosspiece 19 and the detent lever 11 so that the spring 18 holds the detent lever 11 in engagement with the top wall 20 of the housing.

The detent projections 15, 16 are tooth-shaped and have a rear side face 21, which extends at right angles to the web 14, and an oblique forward face 22.

The fitting element which is provided with the receiving openings 4, 5, 6 is inserted and secured in a cylindrical recess 23 of the side wall 24 of the cupboard. The fitting element 2 has a substantially cylindrical housing, which has a peripheral surface that has a sawtooth profile in cross-section. The receiving opening 4 for the detent lever 11 is provided with a step, which is constituted by a sheet metal strip 25 that is L-shaped in cross-section and is embedded in the housing of the fitting element 2 in such a manner that the longer leg of the stip 25' includes an acute angle with the top face 26 of the housing of the fitting element 2. Owing to that acute angle, the inner edge of the sheet metal strip 25 constitutes an abutment edge 26'. When the fitting elements are locked, as is apparent from FIG. 1, the rear faces 21 of the detent noses 15, 16 bear on the abutment edge 26'. As the leg 25' of the sheet metal strip 25 extends in the fitting element 2 at an acute angle to the vertical, the abutment edge 26' engages the rear faces 21 of the detent noses 15, 16 in such a manner that owing to the force exerted by the compression spring 18 a wedge action is obtained and results in a tensile force on the detent lever 11. In this manner the fitting elements 1, 2 are connected and forced against the other by the detent lever 11.

In an alternative arrangement, the leg 25' might be parallel to the top surface 26 of the housing of the fitting element 2. In that case the rear faces 21 of the detent noses must include an obtuse angle with the longitudinal direction of the detent lever 11 in order that the required wedge action will be obtained.

The second, shorter leg 25" of the sheet metal strip 25 serves to improve the fixation in the housing of the fitting element 2.

The receiving opening 4 of the fitting element 2 is provided at its top edge with a ramplike beveled camming surface 27, which adjoins the sheet metal strip 25.

The housing of the fitting element 1 is provided on both sides of the detent lever 11 with locating pins 28, 29, which are adapted to be inserted into complementary receiving openings 5, 6 of the fitting element 2.

The top wall 20 of the housing of the fitting element 1 is formed with an aperture 30, through which a screwdriver 31, for instance, can be inserted to depress the detent lever 11 in order to unlock the fitting elements.

The fitting elements 1, 2 are provided with flangelike edge portions 32, 33, which extend around part of the periphery of the respective fitting element and together with the top faces of the fitting element from steps 34, 35, which interengage as shown in FIG. 1 when the fitting elements are interlocked.

In the embodiments shown in FIGS. 7 and 8 and 15 and 16, the flangelike edge portions of the fitting elements 1, 2 are provided with rearwardly extending tonguelike extensions, which at their end portions carry pluglike projections 36, 37.

In the embodiment shown in FIG. 7, the bar-shaped portion in the form of detent lever 11 is biased by a resilient block 38, which consists of rubber or another elastomeric material.

Alternatively, the detent lever 11 may be biased by a V-shaped leaf spring 39 or by a helical torsion spring 40 having end legs, as shown in FIGS. 10 to 14. To permit the mounting of said springs on the pivot pin 12 for the detent lever 11, the latter is provided with angled lugs 41, 42, which are similar to the legs of a channel section and formed with bearing bores, as is shown in FIG. 14.

The housings of the fitting elements 1, 2 consist of injection-molded plastic material and are formed with recesses 43, which are shown in FIGS. 15 and 17 and receive the angled sheet metal strips 25, which are formed with the abutment edges.

In the embodiment shown in FIGS. 19 to 21, the fitting elements 1, 2 are provided with bores 44 for fixing screws. As a result, the housings of the fitting elements can be secured to the furniture parts in the manner shown in FIG. 21 without need for forming recesses in said furniture parts.

In the embodiment shown in FIG. 22, the pot-shaped fitting element 46 has been inserted into a milled blind hole in the vertical furniture wall and has a slot 47 for receiving the bar-shaped portion in the form of detent lever 49, which carries a hook 48. The underside of the receiving slots 47 is upwardly inclined to the pin 45, which is secured in the side walls of the pot-shaped housing part 46. Behind the pin 45, the underside of the receiving slot 47 drops steeply so as to form a step. The pin 45 is disposed at the rear edge of the step so as to form an abutment edge. The underside of the receiving opening 47 adjoins the periphery of the pin 45 approximately tangentially and the pin 45 protrudes over the vertical plane of the step.

The detent lever 49 is pivoted in the pot-shaped housing 50 on the pivot 51 and is urged by the helical compression spring 52 toward its locking position. The headless screw 54 is screwed into a tapped bore 53 of the top wall of the housing 50 and can be screwed in more deeply so as to force the detent lever 49 out of its locking position and to hold the detent lever in the resulting unlocked position, which is shown in solid lines in FIG. 24. In the locking position, the rear face 55 of the hook 48 of the detent lever 49 bears on the pin 45, as is indicated in phantom in FIG. 24. In that position the rear face 55 engages the pin 45 so as to exert a wedge action so that the interlocked fitting elements shown in FIG. 24 are forced against each other.

The pin 45 is formed with axial flutes, as is apparent from FIG. 23.

The housing 50 is provided with frustoconical locating pins 56, 57, which are disposed on opposite sides of the detent lever 49 and extend into mating apertures of the housing 46.

The flange 58 of the housing 46 is formed in its intermediate portion with a horizontal step 59, and the forward edge of the housing 50 provided with the detent lever 49 bears on the step 59 when the fitting elements are locked.

On the side which is opposite to the flange 58, the housing 46 is provided with short flangelike extensions 60, which bear on the edge of the blind hole. The housing 50 is provided with a corresponding step-shaped recess 61 for receiving the extensions 60.

The housing 50 is provided on its forward face with lateral hooks 62, 63, which serve to improve the fixation to the furniture part. The housing 46 is provided with corresponding recesses for receiving the hooks 62, 63.

To unlock the fitting elements, the fitting element provided with the detent lever comprises in the embodiment shown in FIG. 25 a two-armed lever 64, which is pivoted by means of stub axles 65 shown in FIG. 25. The lever 64 is formed with a laterally offset end portion 66 at which the lever 64 will be held in its unlocking position shown in phantom in FIG. 25. In the locked position, the longer arm 67 of the lever 64 lies in a groove formed in the top face of the housing 50. In order to facilitate the assembling, the housing of the fitting element provided with the detent lever 49 consists of two parts 50, 50', as is apparent from FIGS. 27 and 28.

The fitting element shown in FIG. 29 is basically similar to that shown in FIG. 22 and differs from the latter essentially only in that the interlocked fitting elements are secured to the end faces of shelves and serve to connect these abutting shelves. The pins 68 which are disposed laterally of the detent lever 49 are longer and have a frustopyramidal shape, as is apparent from the corresponding recesses 69 which are formed in the housing 70 and shown in FIG. 30.

The fitting element shown in FIG. 31 is basically similar to the one shown in FIG. 22. Instead of a separate spring for biasing the bar-shaped detent lever 71, a tongue 73 is provided, which has been struck out from the bottom of the pot-shaped housing 72 and extends obliquely to the detent lever 71. The tongue 73 has adequate resilient properties because it is inclined and the housing is an injection molding of plastic material.

The detent hooks 74 of the detent lever 71 are angled like legs of a channel section from the web of the detent lever 71, as is shown in FIG. 32. The pin 75 which constitutes the detent abutment has been inserted with an adequate interference fit into a bore which extends through the housing 76.

The fitting elements shown in FIGS. 33 and 34 correspond to the embodiments of FIGS. 22 and 25, respectively, and have been modified to permit a connection of shelves or the like to a vertical furniture wall on both sides thereof. The housings 78, 78' of those fitting elements which are provided with the abutment pins 79, 79' are inserted into a through bore formed in the vertical furniture wall and are open at the bottom so that they will permit an unobstructed passage of the hooks of the detent levers. The housings 78, 78' are identical and at their confronting ends are formed with laterally offset projections, which interengage when the housings are assembled in mirror symmetry, as is shown in FIG. 34. The detent levers of the fitting elements 80, 80' are laterally offset so that they will be juxtaposed and overlap each other when the fitting elements are locked as shown in FIG. 34.

In the embodiment shown in FIGS. 35 to 37, the two-armed detent levers 82, 83 are pivoted in the housing 81 of the fitting element on a vertical pivot pin 84 and at their forward ends are provided with hooks 85, 86, which at their forward ends in the direction of insertion have wedgelike oblique camming faces 87, 88. The housing 89 of the other fitting element is provided with a receiving opening 90, which is defined by sloping low side walls 91, 92, on which the camming surfaces of the hooks of the detent levers can ride as the latter are inserted. The side walls 91, 92 adjoin the two abutment pins 93, 94 and extend approximately tangentially thereto. The pins 93, 94 extend at right angles to the direction in which the detent levers 82, 83 are inserted. These pins define the throat of the receiving opening. Behind the abutment pins 93, 94, the lateral boundary walls 91, 92 of the receiving opening extend steeply so as to form steps, the protruding edge portions of which are formed by the abutment pins 93, 94.

The pivot pin 84 for the detent levers is surrounded by some convolutions of the helical compression spring 95, the legs 96, 97 of which are arranged in V-shape and bear on those arms 98, 99 of the detent levers which extend beyond the pivot pin 84. As is apparent from FIG. 37, the arms 98, 99 are provided with right-angled acutating elements 100, 101, which extend through the top wall of the housing 81 in a slot 102 that is curved along arc of a circle. As a result, the actuating elements 100, 101 can be actuated by the fingers from the outside.

The housing 81 for the detent levers 82, 83 is split in order to facilitate the assembling.

The housing 81 is additionally provided with a tapered pin 103, which extends into the recess 104 of the housing 98 when the fitting elements are locked.

In the fitting shown in FIGS. 38 to 45, the fitting element 105 is provided with a detent tongue 106, which has been inserted into a recess of the fitting element 105 and is secured in said recess by a pin 107, which is an interference fit in aligned bores of the fitting element and of the detent tongue 106. The detent tongue 106 protrudes from the fitting element 105 to such an extent that the detent tongue 106 can sufficiently extend into a track recess 108 of the other fitting element 109. A spring-biased slider 110 is longitudinally slidably mounted in the fitting element 109, in another track, which extends at right angles to the track 108. The slider consists of a double channel member, which has legs 111, 112 and 113, 114 arranged in pairs that are offset at an angle of 90° and angled in opposite sense from a common web 115. The legs 113, 114 serve to retain a helical compression spring 116, which bears at one end on the crosspiece 115 and at the other end on the pin 117, which is secured in the fitting element 109. As is apparent from FIGS. 38 and 40, the legs 111, 112 protrude into the track 108 and, viewed in the direction of insertion, have steeper forward faces 118 and less steeply sloping rear faces 119 at their top end.

The detent tongue 106 is provided at its forward end with right-angled lateral recesses 120. When the fitting elements are locked, the forward faces 118 of the legs 111, 112 bear on the forward end faces of the recesses 120. As is apparent from FIG. 40, the arrangement is such that the mating surfaces 121, 122 of the fitting element engage each other when the faces 118 of the legs 111, 112 bear approximately with their middle portion on the end faces of the recesses 120. This will ensure that the fitting elements will be held together under initial stress.

The leg 113 of the slider 110 is provided with an outwardly angled portion 123, which extends through a slot 124 of the fitting element 109. From the locked position, shown in FIG. 40, the parts can be released by pressure applied in the direction of the arrow A to the member 123.

It may be added that the detent tongue 106 is provided on its front side with an oblique camming surface 125, which facilitates the depressing of the slider 110 as it is inserted. On both sides of the detent tongue 106, the fitting element 106 is provided with frustoconical locating pins 107, which extend into mating recesses 108 of the fitting element 109 when the fitting elements are locked together.

What is claimed is:

1. A connecting fitting for detachably connecting two platelike furniture parts adapted to abut each other along an abutment plane, said fitting comprising: two housing elements adapted to be secured to respective furniture parts to be connected, one of said housing elements having at least one bar-shaped portion extending therefrom and pivot means for pivotally carrying said bar-shapped portion, said bar-shaped portion adapted to be inserted into an opening of the other housing element until the housing elements engage each other, resilient biasing means carried by said one housing element to urge said bar-shaped portion to pivot about a pivot axis defined by said pivot means toward a locking position, means carried by said one fitting element for pivotally moving said bar-shaped portion from the locking position to an unlocked position against the force of said biasing means and for holding the bar-shaped portion in the unlocked position, locking means operable to hold the housing elements against each other, said locking means including a detent lever defined by said bar-shaped portion mounted in said one housing element and pivotally movable against the force of said biasing means and having at its forward end a detent hook including a front face and a rear face, the other housing element having an opening for receiving the detent hook of the detent lever and having an abutment edge for contact with the rear face of the detent hook so that when the detent lever has been inserted into the opening of said other housing element the detent hook snaps behind said abutment edge, the rear face of the detent hook having a smooth surface to be urged by the biasing means across the abutment edge, the smooth surface being configured for exerting a wedging action on the abutment edge tensioning the detent lever and drawing the housing elements into self-locking interengagement, the distance from the rear face of the detent hook to the pivotal axis of the detent lever decreasing gradually towards the root of said rear face, the abutment edge being engaged by the rear face intermediate its ends when the fitting elements are in self-locking interengagement.

2. A connecting fitting according to claim 1, wherein one of the edge of the opening and the forward face of the detent lever is beveled.

3. A connecting fitting according to claim 1, wherein the housings are adapted to be received and secured in mating recesses of the furniture parts.

4. A connecting fitting according to claim 1, wherein the housing element provided with the detent lever has a side face which is flush with the end edge of the furniture part to be connected and is provided in said side face with an exit opening for the detent lever.

5. A connecting fitting according to claim 1, wherein the housing element which includes the detent lever is provided on both sides of the lever with locating pins and the other housing element includes complementary openings to receive the locating pins.

6. A connecting fitting according to claim 5, wherein the locating pins have a conical taper.

7. A connecting fitting according to claim 1, wherein the detent lever is pivoted on a pivot pin that is secured in the rear portion of the housing.

8. A connecting fitting according to claim 4, wherein the biasing means in the housing element having the detent lever urges said detent lever against an edge of the exit opening of the housing.

9. A connecting fitting according to claim 8, wherein the detent lever is biased by a V-shaped spring, which is mounted on the pivot pin for the detent lever.

10. A connecting fitting according to claim 1, wherein a wall of the housing having the detent lever has an opening adjacent to the detent lever.

11. A connecting fitting according to claim 3, wherein the housings are provided with flangelike protruding edge portions.

12. A connecting fitting according to claim 11, wherein the flangelike edge portions have tonguelike extensions and carry respective retaining plugs.

13. A connecting fitting according to claim 1, wherein the detent lever is a sheet metal blank and the detent hook is in the form of legs which are bent from the blank.

14. A connecting fitting according to claim 1, wherein the detent hook is triangular.

15. A connecting fitting according to claim 3 wherein the housings are made from plastic material.

16. A connecting fitting according to claim 1, wherein the housing element having the receiving opening includes an abutment edge defined by an embedded sheet metal element.

17. A connecting fitting according to claim 16, wherein the sheet metal element is inclined from the top face of the housing.

18. A connecting fitting according to claim 17, wherein the sheet metal element has an angled leg.

19. A connecting fitting according to claim 16, wherein the housing element having the receiving opening is formed with a laterally disposed opening, which extends through at least part of the housing and has a cross-section which corresponds to that of the sheet metal element.

20. A connecting fitting according to claim 16, wherein the opening for receiving the detent lever is beveled toward the abutment edge on the side facing the sheet metal element which forms said abutment edge.

21. A connecting fitting according to claim 1, wherein the housing element formed with the receiving opening is adapted to be secured in a bore formed in the flat side of a furniture part and is provided with a step formed at an edge thereof and which extends above the top face of the housing and interengages with a correspondingly shaped step of the other housing element.

22. A connecting fitting according to claim 1, 2 or 3, wherein the housing elements are adapted to be screwed to the flat sides of the furniture parts.

23. A connecting fitting according to claim 22, wherein one side of each housing lies flat on the flat side of a furniture part.

24. A connecting fitting according to claim 1, wherein the detent abutment edge includes an abutment pin, which is circular in cross-section.

25. A connecting fitting according to claim 24, wherein the abutment pin has an irregular surface.

26. A connecting fitting according to claim 1, wherein the housing element having the detent lever includes a wall adjacent to the detent lever, said wall including a tapped bore and means positioned in said tapped bore to depress the detent lever against the force of the spring.

27. A connecting fitting according to claim 1, wherein the housing element which is provided with the abutment edge includes a flangelike projection, which extends into a corresponding recess in the end face of the other fitting element to prevent an excessively deep forcible insertion of the fitting element into the mounting bore.

28. A connecting fitting according to claim 1, wherein a two-armed lever is pivotally carried by the housing element that is provided with the detent lever, a first arm of said two-armed lever engages an outside wall of the housing element and a second arm engages the detent lever in such a manner that when the first lever arm is approximately parallel to the wall the detent lever is pivotally movable to its locking position, and so that the detent lever is disengaged from the abutment edge by the second arm when the first arm is pivoted away from the wall.

29. A connecting fitting according to claim 28, wherein the two-armed lever has a laterally offset portion, which is adapted to be held in its raised position by the detent lever when the latter has been pivoted away from the wall.

30. A connecting fitting according to claim 28, wherein the wall of the housing element is formed with a recess and when the housing elements are locked, the longer lever arm lies in said recess so that the surface of the longer arm is flush with the wall.

31. A connecting fitting according to claim 1, wherein the housing provided with the detent lever is composed of two halves, which are joined along a center line that is parallel to the detent lever.

32. A connecting fitting according to claim 8, wherein the biasing means which biases the detent lever includes a tongue, which has been struck out from the housing.

33. A connecting fitting according to claim 1, wherein two housing elements provided with abutment edges are positioned in a through bore from opposite sides and the associated housing elements are provided with mutually offset detent levers.

34. A connecting fitting according to claim 33, wherein the housing elements adapted to be inserted into the through bore are identical and have steps or projections which interengage when the housing elements are arranged in mirror symmetry.

35. A connecting fitting according to claim 1, wherein the housing element having the detent lever has a pivot pin which extends at right angles to the longitudinal direction of the housing element, two detent levers are pivoted on said pivot pin and biased by a biasing means toward their expanded position, and the other housing element is provided on both sides of its central receiving opening with two abutment edges which are parallel to the pivot pin.

36. A connecting fitting according to claim 35, wherein those lever ends which are opposite to the hooks carry angled actuating elements, which entend through a slot in a wall of the housing element.

37. A connecting fitting according to claim 35 or 36, wherein the biasing means includes a helical compression spring having end legs arranged in V-shape, the convolutions of said spring surround the pivot pin and the legs of said spring bear on the lever arms which carry the actuating elements.

38. A connecting fitting according to claim 3, wherein the housing of the fitting element that is provided with the detent lever includes lateral projections which extend over and engage the adjacent end face of the furniture part and the other fitting element is formed with corresponding recesses.

39. A connecting fitting according to claim 3, wherein said housings are formed from sheet metal or of die castings or of injection mouldings of plastic material.

40. A connecting fitting according to claim 1, wherein the detent lever which carries the detent hook is pivoted and is biased by a spring and when the fitting elements are interconnected the abutment edge bears with a wedge action on the rear face of the detent hook above the root of said rear face.

41. A connecting fitting for the connection of two plate-like parts of furniture that meet at an angle and abut each other along an abutment plane, preferably at a right angle, said fitting comprising: two fitting parts that can be connected, one of said fitting parts having a recess and an abutment edge, the other part including means capable of being slid into the recess of the one part of the fitting up to the point where the parts of the fitting and parts of the furniture meet, said other part of the fitting having a locking lever which includes a frontal, hook-shaped stop projection so that the parts of the fitting, when they have been slid together, can be connected by the engagement of the hook-shaped stop projection of the locking lever behind the abutment edge of said one fitting part, at least one of the edges of the part of the furniture, the fitting into which the locking lever passes while sliding in, and the frontal surface of the stop projection has a chamfer, spring means for urging the locking lever in a direction for engagement with the abutment surface, means for swinging the locking lever in opposition to the force of the spring into an unlocked position, and wherein when the parts of the fitting are connected, the hook-shaped stop projection engages the abutment edge with a wedge-like effect, so that spring exerts a force that urges the fitting parts continually into contact with each other, and means for maintaining the locking lever in its unlocked position wherein the abutment edge includes an abutment pin having a round cross-section.

42. A connecting fitting in accordance with claim 41, wherein the radial distance of an inner surface of the hook-shaped stop projection of the locking lever continually decreases in a direction from an outer portion of the projection toward the base of the projection from its axis of rotation, and said base of the projection, when the fitting is locked, rests with its central part on the abutment edge.

43. A connecting fitting in accordance with claim 41, wherein the pin includes external grooves that run in an axial direction.

44. A connecting fitting in accordance with claim 41, wherein an edge of the other fitting includes a tapped hole into which a pin-shaped screw may be screwed to press the locking lever down against the force of the spring.

45. A connecting fitting in accordance with claim 41, wherein a wall of the fitting part equipped with the locking lever includes a two-armed lever that is pivotally carried thereon and that has a longer arm and a shorter arm, the longer arm of which pivots away from the fitting, while the shorter arm acts upon the locking lever that rests in the fitting part, so that said locking lever, when the longer lever arm is approximately parallel to the locking lever, is capable of swinging into a locking position by pulling the longer lever arm away from the fitting until a pivot stop is engaged.

46. A connecting fitting in accordance with claim 45, wherein the two-armed lever is bent at an angle so that it is maintained in an outwardly extended position by swung-out the swung-out locking lever.

47. A connecting fitting in accordance with claim 45, wherein a wall of the fitting part having the locking lever includes a recess in which the longer lever arm rests in a locked position within the recess in the wall.

48. A connecting fitting in accordance with claim 41, wherein two fitting parts are each provided with abutment edges and two other fitting parts having locking levers are provided and can be inserted into the through-holes from opposite sides, the two other fitting-parts having locking levers that are offset in relation to one another.

49. A connecting fitting in accordance with claim 48, wherein the other part of fitting parts are substantially identical and one is the mirror image of the other, the parts each having projections that are interengaged.

50. A connecting fitting according to claim 1, wherein pivoting of the detent hook about its axis from a locking position toward an unlocking position causes the outer edge of the rear face of the hook to be displaced from a first position to a second position, the perpendicular projection of said outer edge onto a line perpendicular to said abutment plane and passing through the pivot axis being spaced from said abutment edge a distance sufficient to permit the outer edge of the detent hook to pass over the abutment edge and the detent lever to pivot in order to move the rear face of the hook along the abutment edge until the housing elements are in tightly abutting relationship.

51. A connecting fitting according to claim 41, wherein the rear face of the detent hook includes an inner edge and an outer edge and is laterally spaced from a line passing through the pivot means and extending perpendicularly to the abutment plane defined by the housing elements, the lateral spacing of the rear face of the detent hook being sufficient to permit the outer edge of the hook surface to extend beyond the abutment edge in the second housing member when the housing members are in abutting relationship with each other and the detent lever has been pivoted to its unlocked position, and to permit the inner edge of the rear face of the hook member to bear tightly against the abutment edge to provide a wedge action to tightly hold the furniture parts together.

52. A connecting fitting according to claim 41, wherein pivoting the detent hook about its axis from a locking position toward an unlocking position causes the outer edge of the rear face of the hook to be displaced from a first position to a second position, the perpendicular projection of said outer edge into a line perpendicular to said abutment plane and passing through the pivot axis being spaced from each other a distance sufficient to permit the outer edge of the detent hook to pass over the abutment edge and the detent lever to pivot in order to move the rear face of the hook along the abutment edge until the housing elements are in tightly abutting relationship.

53. A connecting fitting according to claim 1, wherein the distance from the rear face of the detent hook to the pivot axis decreases continuously from an outer edge of the detent hook to an inner edge thereof, and wherein when the rear face engages the abutment edge the engagement is approximately at the mid point of the rear face between inner and outer edges of the detent hook.

54. A connecting fitting according to claim 41, wherein the distance from the rear face of the detent hook to the pivot axis decreases continuously from an outer edge of the detent hook to an inner edge thereof, and wherein when the rear face engages the abutment edge the engagement is approximately at the mid point of the rear face between inner and outer edges of the detent hook.

* * * * *